US007746220B2

(12) United States Patent
Takagi et al.

(10) Patent No.: US 7,746,220 B2
(45) Date of Patent: Jun. 29, 2010

(54) MOVING OBJECT DETECTION APPARATUS (75) Inventors: Toshimasa Takagi, Kobe (JP);
Fumihiro Kasano, Katano (JP);
Hidehiko Fujikawa, Kadoma (JP)

(73) Assignee: Panasonic Electric Works Co., Ltd., Osaka (JP)

( * ) Notice: Subject to any disclaimer, the term of this patent is extended or adjusted under 35 U.S.C. 154(b) by 315 days.

(21) Appl. No.: 11/887,079

(22) PCT Filed: Dec. 29, 2006

(86) PCT No.: PCT/JP2006/326294

§ 371 (c)(1),
(2), (4) Date: Sep. 25, 2007

(87) PCT Pub. No.: WO2007/077940

PCT Pub. Date: Jul. 12, 2007

(65) Prior Publication Data

US 2009/0016162 A1    Jan. 15, 2009

(30) Foreign Application Priority Data

| Jan. 6, 2006 | (JP) | ............................. 2006-001714 |
| Jan. 6, 2006 | (JP) | ............................. 2006-001716 |
| Jun. 30, 2006 | (JP) | ............................. 2006-182468 |

(51) Int. Cl.
*B60Q 1/00* (2006.01)
*B60Q 1/48* (2006.01)
*G01S 15/00* (2006.01)

(52) U.S. Cl. ..................... 340/435; 340/554; 340/436; 340/437; 340/932.2; 367/90; 367/94; 367/99; 367/103; 367/116; 342/152; 342/357.05

(58) Field of Classification Search ......... 340/435–436, 340/932.2; 367/90–116
See application file for complete search history.

(56) References Cited

U.S. PATENT DOCUMENTS 4,225,858 A    9/1980    Cole et al.

(Continued)

FOREIGN PATENT DOCUMENTS

JP    61-054483 A    3/1986

(Continued)

OTHER PUBLICATIONS

Notification of Reasons for Refusal for the Application No. 2006-182468 from Japan Patent Office mailed Jun. 30, 2009.

(Continued)

*Primary Examiner*—Benjamin C Lee
*Assistant Examiner*—Lam P Pham
(74) *Attorney, Agent, or Firm*—Cheng Law Group, PLLC (57) ABSTRACT A moving object detection apparatus comprises a transmitter, a receiver, a detection portion, a binary conversion portion and a judgment portion. The transmitter emits energy waves with a first frequency to a detection area. When receiving incoming energy waves from the detection area, the receiver generates an electric signal corresponding to the incoming energy waves. The detection portion obtains a detection signal from a reference signal with the first frequency and the electric signal. The binary conversion portion compares the detection signal with a conversion threshold signal to obtain a binary signal. The judgment portion judges whether or not a moving object approaching or leaving the receiver exists in the detection area based on the binary signal.

7 Claims, 8 Drawing Sheets

U.S. PATENT DOCUMENTS 4,287,579 A * 9/1981 Inoue et al. .................. 367/94
4,961,039 A * 10/1990 Yamauchi et al. ........... 340/554
5,235,316 A * 8/1993 Qualizza .................... 340/436
5,280,290 A 1/1994 Evans et al.

FOREIGN PATENT DOCUMENTS

| | | |
|---|---|---|
| JP | 62-043507 A | 2/1987 |
| JP | 1-189582 A | 7/1989 |
| JP | 2-090084 A | 3/1990 |
| JP | 3-195990 A | 8/1991 |
| JP | 05-172942 A | 7/1993 |
| JP | 5-259744 A | 10/1993 |
| JP | 8-166449 A | 6/1996 |
| JP | 08-166449 A | 6/1996 |
| JP | 09-272402 A | 10/1997 |
| JP | 2001-296360 A | 10/2001 |
| JP | 2004-358133 A | 12/2004 |

OTHER PUBLICATIONS

International Search Report PCT/ISA/210, Feb. 6, 2007 (3 pages) with English Translation (1 page).
Written Opinion PCT/ISA/237, Feb. 6, 2007 (5 pages).
Notification of Reasons for Refusal for the Application No. 2006-001714 from Japan Patent Office mailed Oct. 27, 2009.
Lin, Sylvia et al., "C-Band Direct Conversion Receiver Front-End Using A Resistive FET Mixer", Microwave Symposium Digest, 1999, IEEE MTT-S, vol. 4, pp. 1409-1411.

* cited by examiner

MOVING OBJECT DETECTION APPARATUS

TECHNICAL FIELD

The invention relates to moving object detection apparatus and more particularly to moving object detection apparatus for detecting, for example, approach of one or more moving objects within a specified distance in a detection area.

BACKGROUND ART

This sort of moving object detection apparatus is used as, for example, a crime prevention device or the like. For example, Japanese Patent Application Publication No. H09-272402 issued Oct. 21, 1997 discloses ultrasonic Doppler type intrusion detection apparatus for vehicle (hereinafter also referred to as "first conventional apparatus"). This apparatus comprises first and second judgment means, and is configured to operate intermittently. The first judgment means judges whether or not a Doppler shift value is in a set range representative of unlawful entry of a person into a vehicle. At this point, the apparatus counts the number of times the first judgment means judges that a Doppler shift value is in the set range, and then obtains a count value. The second judgment means judges whether or not the count value reaches a predetermined value. When the count value reaches the predetermined value, the apparatus gives an alarm. In this apparatus, unlawful entry can be detected without the influence of disturbance. Moreover, since the apparatus operates intermittently, power consumption can be reduced.

Japanese Patent Publication No. S62-43507 issued Sep. 14, 1987 discloses moving object detection apparatus (hereinafter also referred to as "second conventional apparatus"). This apparatus is configured to extract cosine and sine component signals from an output signal for generating ultrasonic waves and an input signal obtained from incoming ultrasonic waves and to convert the cosine and sine component signals into binary signals to set to X and Y coordinates of X-Y coordinate system, respectively. Since an X coordinate value is 1 or 0 and a Y coordinate value is also 1 or 0, a coordinate point (X, Y) corresponds to any quadrant of the coordinate system. And the apparatus judges that a moving object approaching the apparatus exists in a detection area if (X, Y) turns counterclockwise around the origin of the coordinate system, and judges that a moving object leaving the apparatus exists in the detection area if (X, Y) turns clockwise. In this prior art, existence of a moving object approaching or leaving the apparatus can be certainly detected without frequency analysis.

Japanese Patent Application Publication No. H01-189582 issued Jul. 28, 1989 discloses moving object detection apparatus (hereinafter also referred to as "third conventional apparatus"). This apparatus judges whether or not a moving object approaching or leaving an ultrasonic receiver exists in a detection area based on two Doppler signals in the same way as the second conventional apparatus. The apparatus then increases a count value for an alarm in response to the existence of the moving object approaching the receiver and decreases the count value in response to the existence of the moving object leaving the receiver. In this apparatus, the influence caused by the swing of a curtain(s) can be avoided.

In case of the first conventional apparatus, since the apparatus operates intermittently, power consumption can be reduced. However, since the apparatus includes a microcomputer and needs to take a Doppler shift value through an A/D converter, there is an issue that power consumption is increased with the A/D conversion.

In case of the second conventional apparatus and the third conventional apparatus, since each apparatus includes a pair of binary converters, a pair of level detection circuits and an OR circuit, simplified construction is desired in addition to reduction of power consumption.

DISCLOSURE OF THE INVENTION

It is therefore an object of the present invention to reduce power consumption and to simplify the construction of moving object detection apparatus.

Moving object detection apparatus of the present invention comprises a transmitter, a receiver, a detection portion, a binary conversion portion and a judgment portion. The transmitter emits energy waves with a first frequency to a detection area. When receiving incoming energy waves from the detection area, the receiver generates an electric signal corresponding to the incoming energy waves. The detection portion obtains a detection signal from a reference signal with the first frequency and the electric signal. When at least one second frequency different from the first frequency is obtained from the electric signal, the detection signal becomes a Doppler shift signal obtained from the first frequency and the at least one second frequency. The binary conversion portion compares the detection signal with a conversion threshold signal to obtain a binary signal. The judgment portion judges whether or not a moving object approaching or leaving the receiver exists in the detection area based on the binary signal.

In this configuration, since the binary conversion portion is provided, increase of power consumption by A/D conversion can be avoided even if the judgment portion is formed of, for example, a microcomputer. Moreover, the binary conversion portion compares the detection signal with the conversion threshold signal to obtain a binary signal, and thereby it is possible to omit circuits such as the level detection circuit and the OR circuit included in the second conventional apparatus and the third conventional apparatus. Therefore, it is possible to reduce power consumption and to simplify the construction of the moving object detection apparatus.

In an enhanced embodiment, the moving object detection apparatus further comprises an oscillator, and the detection portion is provided with a phase shifter, and first and second detection parts. In addition, the binary conversion portion is provided with first and second binary converters, while the judgment portion is provided with a first judgment part, a first counter and a second judgment part. The oscillator generates a first reference signal having the first frequency and supplies the transmitter with the first reference signal to cause the transmitter to emit sine-wave shaped energy waves with the first frequency to the detection area. The phase shifter shifts the phase of the first reference signal by ¼ period to produce a second reference signal. The first detection part mixes the electric signal generated by the receiver with the first reference signal generated by the oscillator to produce a first detection signal. When the second frequency is obtained from the electric signal, the first detection signal becomes a first Doppler shift signal that has a frequency of the difference between the first frequency and the second frequency. The second detection part mixes the electric signal generated by the receiver with the second reference signal produced by the phase shifter to produce a second detection signal. When the second frequency is obtained from the electric signal, the second detection signal becomes a second Doppler shift signal that has a frequency of the difference between the first frequency and the second frequency and is different in phase by ¼ period from the first Doppler shift signal. The first binary converter compares the first detection signal with a first conversion threshold signal to obtain a first binary signal. The second binary converter compares the second detection signal with a second conversion threshold signal to obtain a second binary signal. The first judgment part takes a transition factor whenever first and second values are respectively set to first and second coordinates in two-dimensional coordinate system in response to the levels of the first and second binary signals. The transition factor is specified by the first and second coordinates. If taken each transition factor crosses one coordinate axis in the coordinate system, the first judgment part judges that a moving object approaching or leaving the receiver exists in the detection area, and otherwise judges that the moving object does not exist in the detection area. In case that said moving object exists in the detection area, the first judgment part judges that said moving object approaches the receiver if said each transition factor moves around the origin of the coordinate system in one direction, and judges that said moving object leaves the receiver if said each transition factor moves in reverse direction to the one direction. The first counter adds a first polarity value to a first count value in case that said moving object exists in the detection area and approaches the receiver, and adds a second polarity value to the first count value in case that said moving object exists in the detection area and leaves the receiver. The second polarity value is equal in absolute value to the first polarity value and different in polarity from the first polarity value. When the absolute value of the first count value is larger than that of a judgment threshold value, the second judgment part sends out an existence signal representing that said moving object exists in the detection area. The judgment threshold value is equal in polarity to the first polarity value.

In this configuration, when a moving object exists in the detection area and is approaching the receiver, the absolute value of the first count value becomes larger than that of the judgment threshold value. Therefore, when the moving object approaches the receiver within the distance corresponding to the judgment threshold value, it is possible to cause the second judgment part to send out the existence signal. Moreover, in case that there is, for example, a curtain in the detection area, even if the curtain is swung by the wind to approach and leave the receiver, each second polarity value cancels each first polarity value with respect to the first count value. As a result, the moving object detection apparatus can be configured to send out the existence signal only when a moving object approaches the receiver within the distance corresponding to the judgment threshold value.

In a preferred embodiment, the first detection part includes a first signal pass and a first field effect transistor, while the second detection part includes a second signal pass and a second field effect transistor. The first signal pass is formed to supply the binary conversion portion with the electric signal generated by the receiver. The first field effect transistor is connected between the first signal pass and Ground, and is turned on and off in response to the first reference signal. This transistor produces the first detection signal by adding the first reference signal components corresponding to a predetermined polarity to the electric signal. The second signal pass is formed to supply the binary conversion portion with the electric signal generated by the receiver. The second field effect transistor is connected between the second signal pass and Ground, and is turned on and off in response to the second reference signal. This transistor produces the second detection signal by adding the second reference signal components corresponding to a predetermined polarity to the electric signal. In this configuration, since each of the first and second field effect transistors does not need a power source, power consumption can be further reduced.

In another preferred embodiment, a power source of the moving object detection apparatus is comprised of a switching regulator. The switching frequency of the regulator is equal to or higher than the first frequency. In this configuration, the reduction of power consumption is possible, and energy waves can be emitted continuously.

In another enhanced embodiment, the binary conversion portion is further provided with third and fourth binary converters. The third binary converter compares the first detection signal with a third window signal to obtain a third binary signal. The third window signal is set to a third window range larger than a first window range specified by a first window signal as the first conversion threshold signal. The fourth binary converter compares the second detection signal with a fourth window signal to obtain a fourth binary signal. The fourth window signal is set to a fourth window range larger than a second window range specified by a second window signal as the second conversion threshold signal. The second window range is substantially equal to the first window range, and the fourth window range is substantially equal to the third window range. In addition, if a level of the first or second detection signal is within the third or fourth window range, respectively, the first judgment part judges that a moving object approaching or leaving the receiver does not exist in the detection area regardless of the first and second binary signals. If the levels of the first and second detection signals are outside the third and fourth window ranges, respectively, the first judgment part judges whether said moving object approaches or leaves the receiver as described above when the phase difference between the first and second binary signals is larger than a reference phase. The reference phase corresponds to the difference between the first or second window range and the third or fourth window range. In this case, it is possible to remove unwanted components that are obtained from incoming energy waves from small vibration objects under the influence of disturbance and are within the third and fourth window ranges. As a result, it can be prevented that false detection is made under the influence of, for example, small vibration when a moving object approaching or leaving the receiver does not exist in the detection area.

In a preferred embodiment, each of the third and fourth window ranges is set to twice of each of the first and second window ranges, and the reference phase is set in the range of $\pi/6$ to $\pi/4$.

In another enhanced embodiment, the judgment portion is provided with a first judgment part, a first counter, a second judgment, a second counter and a subtracter. The first judgment part judges whether or not a moving object approaching or leaving the receiver exists in the detection area based on the binary signal. The first counter renews a first count value based on each judgment result of the first judgment part. The first counter adds a constant value to the first count value if the first judgment part judges that said moving object exists in the detection area, and keeps the first count value as-is if the first judgment part judges that said moving object does not exist in the detection area. When the absolute value of the first count value is larger than that of a first judgment threshold value, the second judgment part sends out an existence signal representing that said moving object exists in the detection area. The second counter counts the number of times the first judgment part continuously judges that said moving object does not exist in the detection area, and then obtains a second count value corresponding to the number of times. The subtracter decreases the absolute value of the first count value when the absolute value of the second count value is larger than that of a second judgment threshold value.

In this configuration, when energy waves from the transmitter are reflected by said moving object in the detection area, the first frequency is shifted to said at least one second frequency by the Doppler effect (Doppler shift). Therefore, the first judgment part can judge whether or not a moving object approaching or leaving the receiver exists in the detection area based on the first frequency and the second frequency. Moreover, even if the first judgment part makes a false judgment that said moving object exists in the detection area, for example, under the influence of low frequency noise caused by air fluid in the detection area, the first judgment part continuously judges that said moving object does not exist in the detection area under such low frequency noise in general, and therefore the absolute value of the second count value can be made larger than that of the second judgment threshold value. As a result, since the absolute value of the first count value is decreased, it is possible to avoid the false detection concerning existence or nonexistence of said moving object.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1:
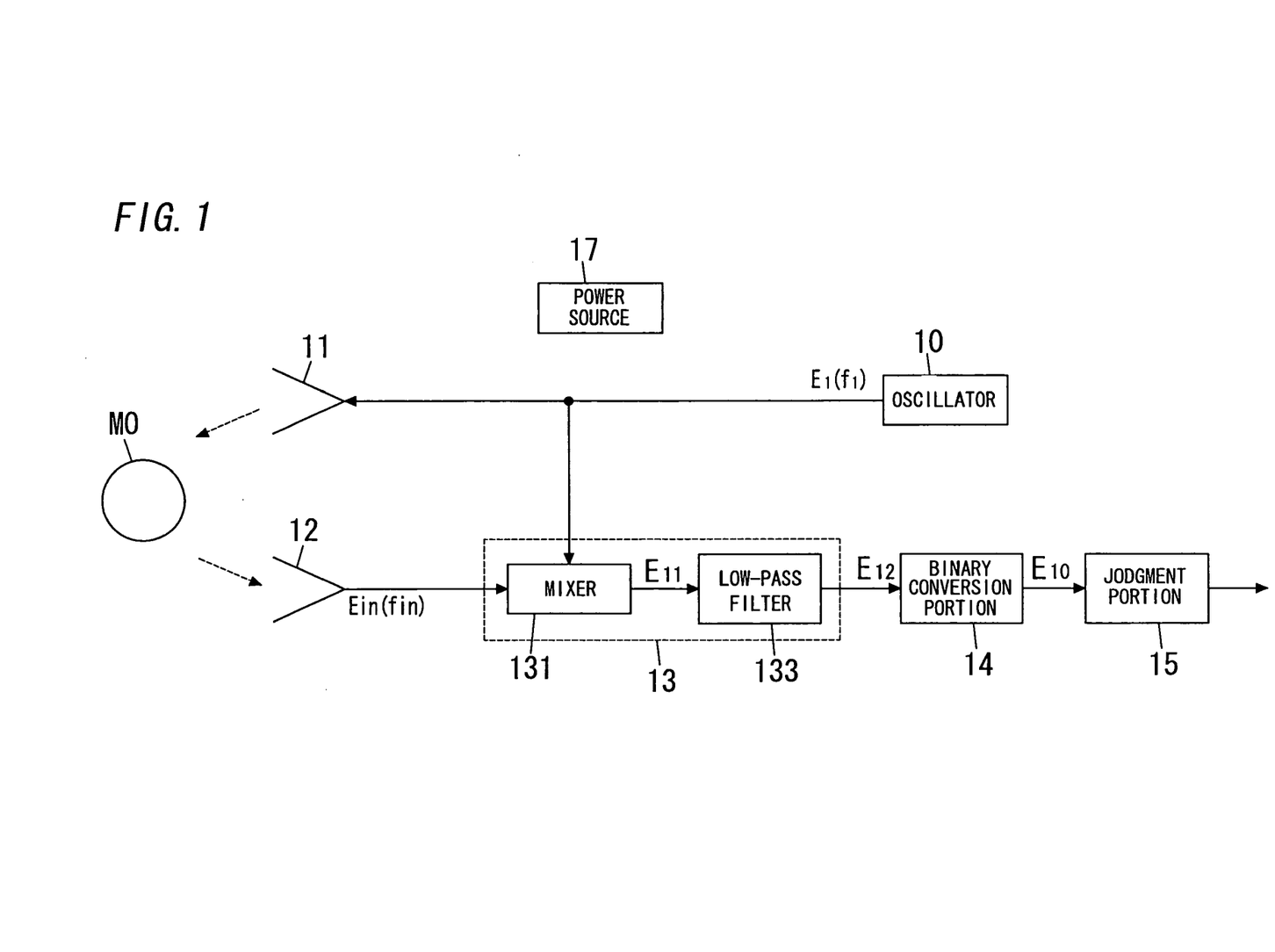
FIG. 1 is a block diagram of a first embodiment according to the present invention.

FIG. 1 shows a first embodiment according to the present invention, namely moving object detection apparatus. This apparatus belongs to an ultrasonic Doppler type, and comprises an oscillator 10, a transmitter 11, a receiver 12, a detection portion 13, a binary conversion portion 14, a judgment portion 15 and a power source 17.

For example, the oscillator 10 generates a reference signal (electric signal) $E_1$ having a first frequency (ultrasonic frequency) $f_1$ and supplies the signal $E_1$ to the transmitter 11 and the detection portion 13. However, not limited to this, the energy waves of the present invention may be micro waves or electric waves. In addition, the waveform of the reference signal (electric signal) $E_1$ may be a sine wave shape.

The transmitter 11 is configured to emit sine wave shaped ultrasonic waves with the frequency $f_1$ to a detection area in accordance with the signal $E_1$ from the oscillator 10. For example, the transmitter 11 is formed of an output device such as a piezoelectric loudspeaker, a piezoelectric vibrator or the like, and a drive circuit that drives the output device in accordance with the signal $E_1$. When receiving incoming ultrasonic waves from the detection area, the receiver 12 is configured to produce an electric signal $E_{in}$ corresponding to the incoming ultrasonic waves to supply the signal $E_{in}$ to the detection portion 13. For example, the receiver 12 is formed of an input device such as a piezoelectric microphone, a piezoelectric vibrator or the like, and a signal processing circuit for amplification and waveform shaping of a signal obtained from the input device. However, not limited to these, the transmitter and the receiver of the present invention may include, for example, a transducer comprised of a piezoelectric vibrator or the like.

The detection portion 13 is configured to obtain a detection signal from the electric signal $E_{in}$ and the reference signal $E_1$ with the first frequency $f_1$. When at least one second frequency $f_{in}$ different from the frequency $f_1$ is obtained from the signal $E_{in}$, the detection signal becomes a Doppler shift signal obtained from the frequency $f_1$ and the at least one frequency $f_{in}$.

The detection portion 13 is formed of, for example, a mixer (phase detection circuit) 131 and a low-pass filter 133. The mixer 131 is configured to mixes the signal $E_{in}$ with signal $E_1$ to produce a mixed signal $E_{11}$. The filter 133 removes harmonic components from the signal $E_{11}$ to produce a signal $E_{12}$ as the detection signal, and then supplies the signal $E_{12}$ to the binary conversion portion 14.

The operational theory of the detection portion 13 is explained. For example, when a moving object approaching or leaving the receiver 12 (hereinafter referred to as a "moving object MO") exists in the detection area and ultrasonic waves from the transmitter 11 are reflected by the moving object MO, the first frequency $f_1$ of the ultrasonic waves is shifted to at least one second frequency $f_{in}$ different from $f_1$ by the Doppler shift. In this case, when the signals $E_{in}$ and $E_1$ are respectively represented by $A_{in} \sin(2\pi f_{in} t+\phi)$ and $A_1 \sin(2\pi f_1 t)$, a signal $E_{in}E_1$ obtained by mixing the signals is given by $$E_{in}E_1 = A_{in}A_1(\cos\{2\pi(f_{in}-f_1)t+\phi\} - \cos\{2\pi(f_{in}+f_1)t+\phi\})/2 \quad \text{(eq. 1)},$$

where $A_{in}$ and $A_1$ are respectively amplitudes of the signals $E_{in}$ and $E_1$, and $\phi$ is a phase. The components including $f_{in}+f_1$ are removed by the filter 133, and then a detection signal ($E_{12}$) is obtained. The detection signal in this case corresponds to $A_{in}A_1(\cos\{2\pi(f_{in}-f_1)t+\phi\})/2$ and contains $\cos\{2\pi(f_{in}-f_1)t+\phi\}$ as the main components, and accordingly becomes a Doppler shift signal (beat signal) having different frequency between the first frequency $f_1$ and the second frequency $f_{in}$. However, not limited to this, in case that the components including $f_{in}+f_1$ is utilized, the detection portion 13 can comprise a high-pass filter instead of the low-pass filter 133.

Figure 2:
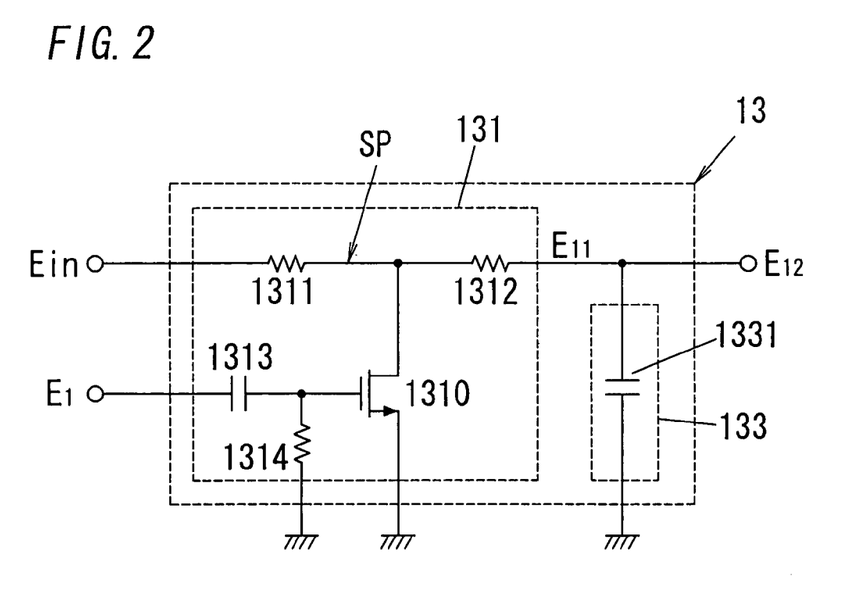
FIG. 2 is a circuit diagram of a mixer in the first embodiment.

In the first embodiment, as shown in FIG. 2, the mixer 131 includes: a signal pass SP for supplying the signal $E_{in}$ generated by the receiver 12 to the binary conversion portion 14 through the filter 133; and a field effect transistor 1310 which is connected between the pass SP and Ground and turns on and off in response to the reference signal $E_1$. The drain of the transistor 1310 is connected between resistors 1311 and 1312 constituting the pass SP, while the source of the transistor 1310 is connected to Ground. The gate of the transistor 1310 is supplied with the signal $E_1$ through a capacitor for DC cut (1313) and a resistor for discharge (1314). This transistor

1310 does not need a power source, and operates to add components of the signal $E_1$ corresponding to predetermined polarity to the signal $E_{in}$ in response to the signal $E_1$. As a result, the signal $E_{12}$ is obtained through the filter 133 including, for example, a capacitor 1331. In the example of FIG. 2, since the transistor 1310 turns on in response to positive voltage of the signal $E_1$, positive voltage components of the signal $E_1$ are added to the signal $E_{in}$. The positive voltage components of the signal $E_1$ include the first frequency $f_1$. Accordingly when the second frequency $f_{in}$ is obtained from the signal $E_{in}$, the detection signal becomes a Doppler shift signal (beat signal) having the difference between the frequency $f_1$ and the frequency $f_{in}$.

The binary conversion portion 14 is configured to compare the detection signal $E_{12}$ with a conversion threshold signal to obtain a binary signal $E_{10}$. For example, the binary conversion portion 14 is formed of a window comparator, and compares the detection signal with window signals set to a predetermined window range. The detection signal is converted into the binary signal $E_{10}$ to be supplied to the judgment portion 15 in case that the level of the detection signal is out of the window range, while the binary signal is not supplied to the judgment portion 15 in case that the level of the detection signal is within the window range. Specifically, in case that the level of the detection signal is within the window range, the output level of the binary conversion portion 14 does not change. However, not limited to this, the binary conversion portion 14 may be a comparator with a single threshold.

The judgment portion 15 is configured to judge whether or not a moving object MO exists in the detection area based on the binary signal $E_{10}$, and to send out an existence signal representing existence of the object MO in the area in case that the object MO exists in the area. For example, the portion 15 comprises a microcomputer (micon) including a CPU and a storing device, and is configured to judge that the MO exists in the area when the binary signal $E_{10}$ is continuously obtained during equal to or more than a specified time from the binary conversion portion 14.

The power source 17 is formed of a switching regulator, and the switching frequency is set to equal to or higher than the first frequency. In addition, in case that the moving object detection apparatus is used as a crime prevention device like the first conventional apparatus, output voltage of the source 17 is set to voltage (e.g., 3V or 5V) lower than a battery voltage of a vehicle (e.g., 12V). Accordingly, power consumption can be reduced and supersonic waves can be emitted continuously.

The operation of the first embodiment is explained. The transmitter 11 emits ultrasonic waves with the frequency $f_1$ to a detection area in accordance with a signal $E_1$ from the oscillator 10, while the detection portion 13 produces a signal $E_{12}$ in response to a signal $E_{in}$ from the receiver 12 to supply the signal $E_{12}$ to the binary conversion portion 14. The signal $E_{12}$ is converted into a binary signal $E_{10}$ to be supplied to the judgment portion 15 in case that the level of the signal $E_{12}$ is out of the window range of the portion 14, while the binary signal $E_{10}$ is not substantially supplied to the portion 15 in case that the level of the signal $E_{12}$ is within the range. When the signal $E_{10}$ is continuously obtained during equal to or more than the specified time, the portion 15 sends out an existence signal.

In the first embodiment, since the binary conversion portion 14 is provided, increase of power consumption by A/D conversion can be avoided even if the judgment portion 15 is formed of, for example, a micon. Moreover, the portion 14 compares a detection signal with the conversion threshold signal to obtain a binary signal, and thereby it is possible to omit circuits such as the level detection circuit and the OR circuit included in the second conventional apparatus and the third conventional apparatus. Therefore, it is possible to reduce power consumption and to simplify the construction of the moving object detection apparatus.

Figure 3:
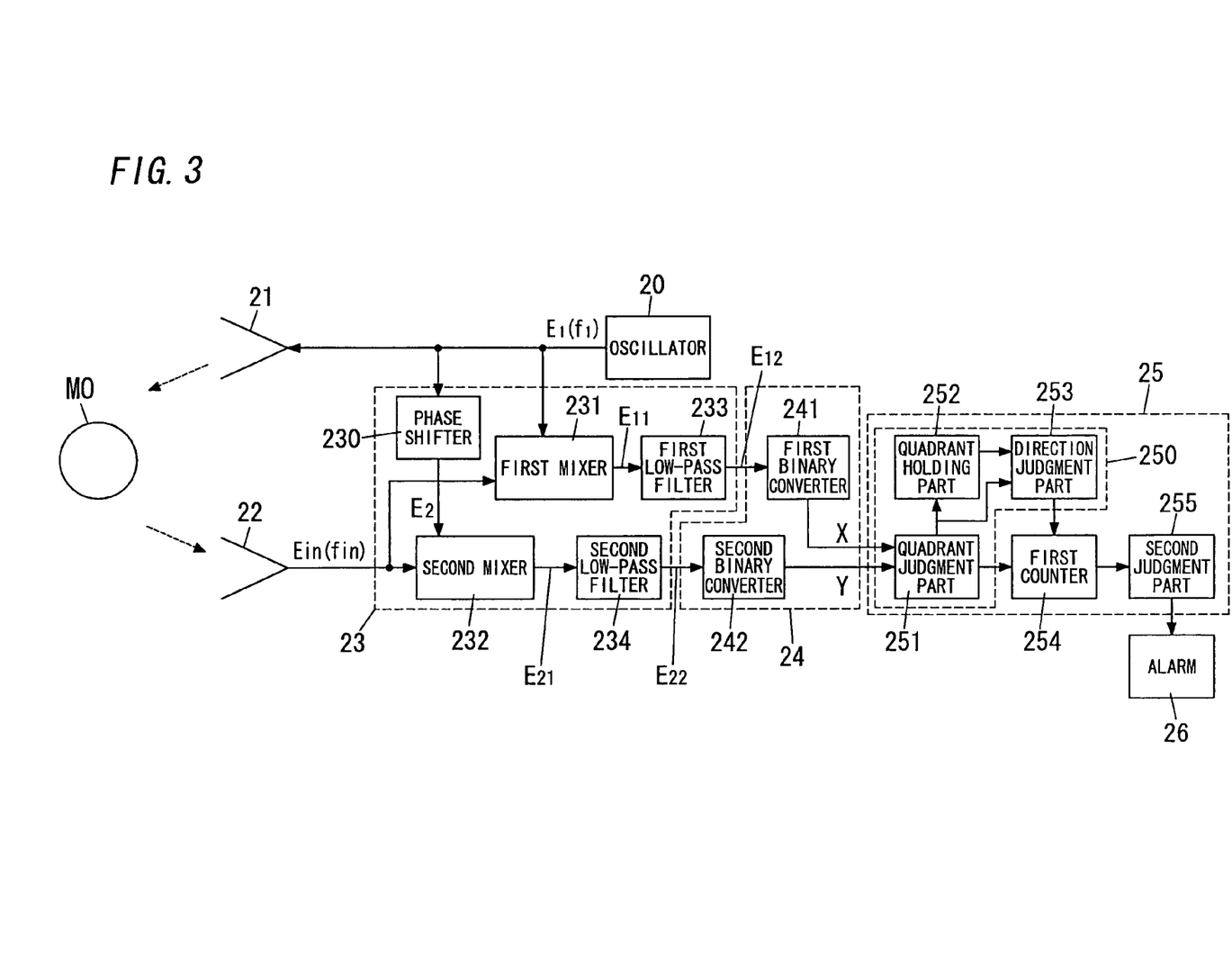
FIG. 3 is a block diagram of a second embodiment according to the present invention.

FIG. 3 shows a second embodiment according to the present invention, namely moving object detection apparatus. This apparatus is provided with an oscillator 20, a transmitter 21, a receiver 22 and a power source (not shown) which are formed like the first embodiment, and is further provided with a detection portion 23, a binary conversion portion 24, a judgment portion 25 and an alarm 26.

The detection portion 23 is formed of a phase shifter 230, first and second mixers 231 and 232, and first and second low-pass filters 233 and 234, for example, in the same way as a conventional synchronous detection circuit. For example, the phase shifter 230 advances the phase of a first reference signal $E_1$ with a first frequency $f_1$ by one-fourth period (e.g., 90°) to produce a second reference signal $E_2$, and supplies the signal $E_2$ to the mixer 232.

Each of the first and second mixers 231 and 232 is formed of, for example, a multiplication circuit like the conventional one. However, not limited to this, each mixer may be formed of the same circuit as that in FIG. 2. For example, when a moving object MO exists in a detection area and ultrasonic waves from the transmitter 21 are reflected by the object MO, a signal $E_{in}E_1$ obtained by mixing signals $E_{in}$ and $E_1$ is given by said (eq. 1). The components including $f_{in}+f_1$ are removed through the filter 233, and then a first detection signal ($E_{12}$) is obtained. The detection signal in this case becomes a first Doppler shift signal that has the frequency of the difference between the first frequency $f_1$ and the second frequency $f_{in}$. Similarly, when the signal $E_2$ is represented by $A_2 \cos(2\pi f_1 t)$, a signal $E_{in}E_2$ obtained by mixing the signals $E_{in}$ and $E_2$ is given by $$E_{in}E_2 = A_{in}A_2(\sin\{2\pi(f_{in}-f_1)t+\phi\}+\sin\{2\pi(f_{in}+f_1)t+\phi\})/2,$$

where $A_2$ is amplitude of the signal $E_2$. The components including $f_{in}+f_1$ are removed through the filter 234, and then a second detection signal ($E_{22}$) is obtained. The detection signal $E_{22}$ in this case corresponds to $A_{in}A_2(\sin\{2\pi(f_{in}-f_1)t+\phi\})/2$ and includes $\sin\{2\pi(f_{in}-f_1)t+\phi\}$ as the main component, and accordingly becomes a second Doppler shift signal. This signal has the frequency of the difference between the first frequency $f_1$ and the second frequency $f_{in}$, and is different in phase by one-fourth period from the first Doppler shift signal.

The binary conversion portion 24 comprises first and second binary converters 241 and 242. The converter 241 is configured to compare the first detection signal $E_{12}$ with a first conversion threshold signal to obtain a first binary signal X. The converter 242 is also configured to compare the second detection signal $E_{22}$ with a second conversion threshold signal to obtain a second binary signal Y. For example, each of the converters 241 and 242 is a window comparator. The converter 241 compares the signal $E_{12}$ with window signals set to a predetermined window range. On the other hand, the converter 242 compares the signal $E_{22}$ with window signals set to a predetermined window range. However, each of the converters 241 and 242 may be a comparator with a single threshold.

In the second embodiment, if the level of the signal $E_{12}$ is out of the window range, the signal $E_{12}$ is converted into a binary signal X to be supplied to the judgment portion 25. On the contrary, if the level of the signal $E_{12}$ is within the window range, the binary signal X is not substantially supplied to the portion 25. In case that the signal X is supplied to the portion 25, the signal X becomes, for example, a high signal if the level of the signal $E_{12}$ exceeds the upper limit of the window range. If the level of the signal $E_{12}$ falls below the lower limit of the window range, the signal X becomes, for example, a Low signal. Similarly, the level of the signal $E_{22}$ is out of the window range, the signal $E_{22}$ is converted into a binary signal Y to be supplied to the portion 25. On the contrary, if the level of the signal $E_{22}$ is within the window range, the binary signal Y is not substantially supplied to the portion 25. In case that the signal Y is supplied to the portion 25, the signal Y becomes, for example, a high signal if the level of the signal $E_{22}$ exceeds the upper limit of the window range. If the level of the signal $E_{22}$ falls below the lower limit of the window range, the signal Y becomes, for example, a Low signal.

The judgment portion 25 comprises a first judgment part 250, a first counter 254 and a second judgment part 255, and is formed of, for example, a micon including a CPU and a storage device, and so on. However, not limited to this, the first judgment part 250, first counter 254 and second judgment part 255 may be formed of a logic device, an integration circuit and threshold circuit (comparators) like the second conventional apparatus, respectively.

The first judgment part 250 is formed of quadrant judgment part 251 and quadrant holding part 252 for a first process as well as a direction judgment part 253 for second and third processes. The part 252 stores at least two-bit data. In case of the first process, whenever setting digital values $X_n$ and $Y_n$ to coordinates X and Y in X-Y coordinate system in response to binary signals X and Y from the binary conversion portion 24, respectively, the part 251 takes the transition factor specified by the coordinates X and Y The coordinate X is set to "1" if the binary signal X is a high signal, and is set to "0" if the signal X is a low signal. Also, the coordinate Y is set to "1" if the binary signal Y is a high signal, and is set to "0" if the signal Y is a low signal. Therefore, in case of X=1 and Y=1, the transition factor corresponds to the first quadrant, and accordingly the part 251 replaces quadrant information of the part 252 with the first quadrant and the part 252 holds information of the first quadrant. Similarly, the part 251 replaces quadrant information of the part 252 with the second quadrant in case of X=0 and Y=1, with the third quadrant in case of X=0 and Y=0, and with the fourth quadrant in case of X=1 and Y=0.

In case of the second process, the direction judgment part 253 judges that a moving object MO exists in the detection area if each taken transition factor (($X_n$, $Y_n$); n=1, 2, . . . ) crosses one coordinate axis of the coordinate system. Otherwise, the part 253 judges that the object MO does not exist in the area. In the second embodiment, since a transition factor corresponds to any quadrant, the part 253 judges whether or not a moving object MO exists in the detection area before the quadrant information of the quadrant holding part 252 is renewed. That is, if the quadrant information obtained by the judgment part 251 is different from the quadrant information held by the part 252, the part 253 judges that the object MO exists in the area, and then proceeds to the third process. Otherwise, the part 253 judges that the object MO does not exist in the area.

In case of the third process, namely in case that the moving object MO exists in the detection area, the judgment part 253 judges whether or not the object MO approaches or leaves the receiver 22 based on the quadrant information taken by the judgment part 251 and the quadrant information held by the quadrant holding part 252. That is, the part 253 judges that the object MO approaches the receiver 22 if each quadrant information (transition factor) moves in one direction around the origin of the coordinate system. If each transition factor moves in the opposite direction to the one direction, the part 253 judges that the object MO leaves the receiver 22.

Figure 4A:
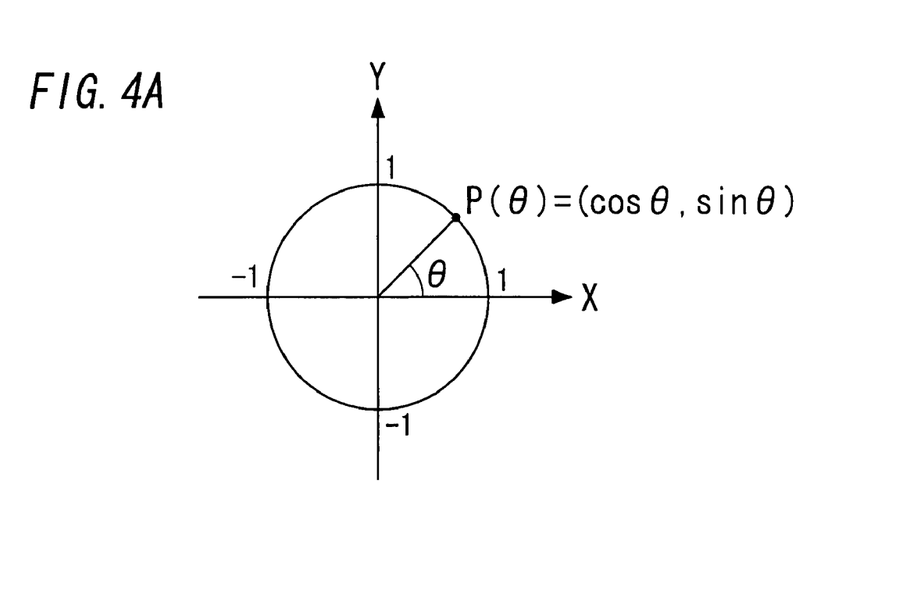
FIG. 4A is an explanatory diagram of judgment theory by a first judgment part in FIG. 3.
Figure 4B:
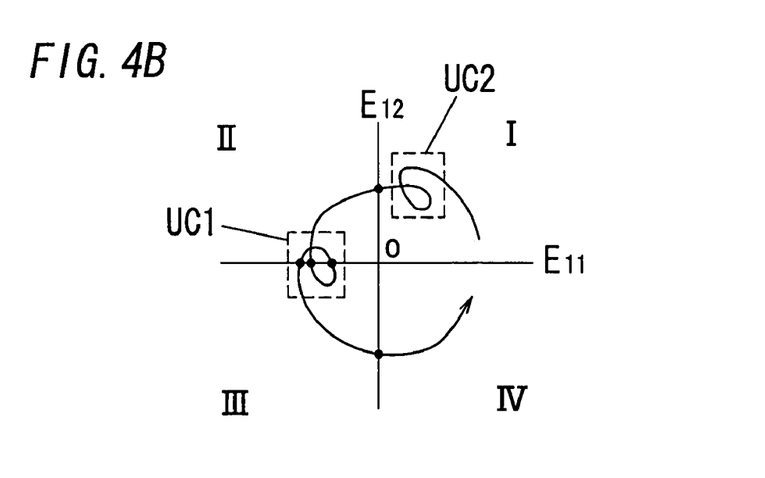
FIG. 4B illustrates a locus of transition factors (transition points) obtained from actual first and second detection signals of a detection portion of FIG. 3 in case that a moving object approaches a receiver of FIG. 3.

This judgment theory is explained. As shown in FIG. 4A, when a point P(θ) is on the circumference of a circle of radius 1, the point P(θ) turns counterclockwise around the origin of the X-Y coordinate system in response to increasing of an angle θ, and turns clockwise in response to decreasing of the angle θ. Therefore, when the moving object MO approaches the receiver 22 ($f_{in}$>$f_1$), each transition factor ($X_n$, $Y_n$) turns counterclockwise around the origin of the coordinate system. On the contrary, when the object MO leaves the receiver 22 ($f_{in}$<$f_1$), each transition factor ($X_n$, $Y_n$) turns clockwise. In the second embodiment, the judgment part 253 judges that the object MO approaches the receiver 22 when each transition factor ($X_n$, $Y_n$) turns counterclockwise, and judges that the object MO leaves the receiver 22 when each transition factor ($X_n$, $Y_n$) turns clockwise. In fact, ultrasonic waves from the transmitter 21 are reflected at each part of the object MO, so that each of actual first and second detection signals contains frequency components. Accordingly, transition factors (transition points) determined by the actual first and second detection signals move on the outer peripheral of the distorted circle as shown in FIG. 4B. In case of the second embodiment, although unwanted components UC1 turning 360 degrees while passing any axis of the coordinate system cannot be removed, unwanted components UC2 turning 360 degrees in the same quadrant can be removed.

The first counter 254 renews a first count value based on each judgment result of the first judgment part 250. The counter 254 adds a constant value to the first count value if the part 250 judges that a moving object MO exists in the detection area. If the part 250 judges that the object MO does not exist in the area, the counter 254 keeps the first count value as-is. In the second embodiment, if the part 250 judges that the object MO exists in the area and approaches the receiver 22, the counter 254 adds a first polarity value to the first count value. The first polarity value is equal to said constant value in absolute value and equal to first threshold in polarity, e.g., "1". If the part 250 judges that the object MO exists in the area and leaves the receiver 22, the counter 254 adds a second polarity value to the first count value. The second polarity value is equal to said constant value in absolute value and different from the first polarity value in polarity, e.g., "−1". In the example of FIG. 4B, the counter 254 adds "1" to the first count value when transition factors change from (1, 1) representative of the first quadrant to (0, 1) representative of the second quadrant. The counter 254 adds "1" to the first count value when transition factors change from (0, 1) representative of the second quadrant to (0, 0) representative of the third quadrant. The counter 254 then adds "−1" to the first count value when transition factors change from (0, 0) representative of the third quadrant to (0, 1) representative of the second quadrant.

The second judgment part 255 supplies the alarm 26 with an existence signal representing that a moving object MO exists in the detection area when the absolute value of the first count value is larger than that of the first threshold value. In the second embodiment, when the first count value is larger than the first threshold value, the existence signal is supplied to the alarm 26.

The alarm 26 is formed of, for example, a buzzer and a buzzer driving circuit, and gives an alarm when receiving the existence signal from the judgment part 255. In another example, the alarm 26 may be an indication circuit, a communication device or the like.

The operation of the second embodiment is explained. The transmitter 21 emits ultrasonic waves with the frequency $f_1$ to a detection area in accordance with a signal $E_1$ from the oscillator 20. On the other hand, the detection portion 23 produces signals $E_{12}$ and $E_{22}$ in response to a signal $E_{in}$ from the receiver 22 to supply the signals to judgment portion 25 through the binary conversion portion 24. The portion 25 judges whether or not a moving object MO exists in the detection area based on the binary signals X and Y from the binary conversion portion 24, and judges whether the object MO approaches or leaves the receiver 22 in case that the object MO exists. The first counter 254 then renews the first count value based on each judgment result of the judgment part 250. When the first count value is greater than the first threshold value, the second judgment part 255 supplies an existence signal to the alarm 26, and the alarm 26 gives an alarm.

In the second embodiment, when a moving object MO exists in the detection area and is approaching the receiver 22, the first count value becomes larger than the first threshold value. Therefore, when the object MO approaches the receiver 22 within the distance corresponding to the first threshold value, it is possible to cause the second judgment part 255 to supply an existence signal to the alarm 26. Moreover, in case that there is, for example, a curtain in the area, even if the curtain(s) is swung by the wind to approach and leave the receiver 22, each second polarity value cancels each first polarity value with respect to the first count value. As a result, the moving object detection apparatus can be formed to supply the existence signal to the alarm 26 only when the object MO approaches the receiver 22 within the distance corresponding to the first threshold value.

In case that a moving object MO exists in the detection area, frequency f of each Doppler shift signal in the second embodiment is given by $$|f| \approx 2vf_1/c,$$

where v and c are moving speed of the object MO and ultrasonic propagation speed, respectively. Therefore, the frequency f is in proportion to the moving speed of the object MO. When the object MO moves unit distance, the number of waves N of each Doppler shift signal is given by $N=2f_1/c$. Therefore, if each of c and $f_1$ is constant, the number of waves N becomes constant regardless of the moving speed of the object MO, and accordingly the number of times of quadrant transition also becomes constant. That is, the number of times of quadrant transition is 4×N and in proportion to the moving speed of the object MO. Therefore, by utilizing the first count value, moving distance and moving direction of the object MO can be seen.

Figure 5:
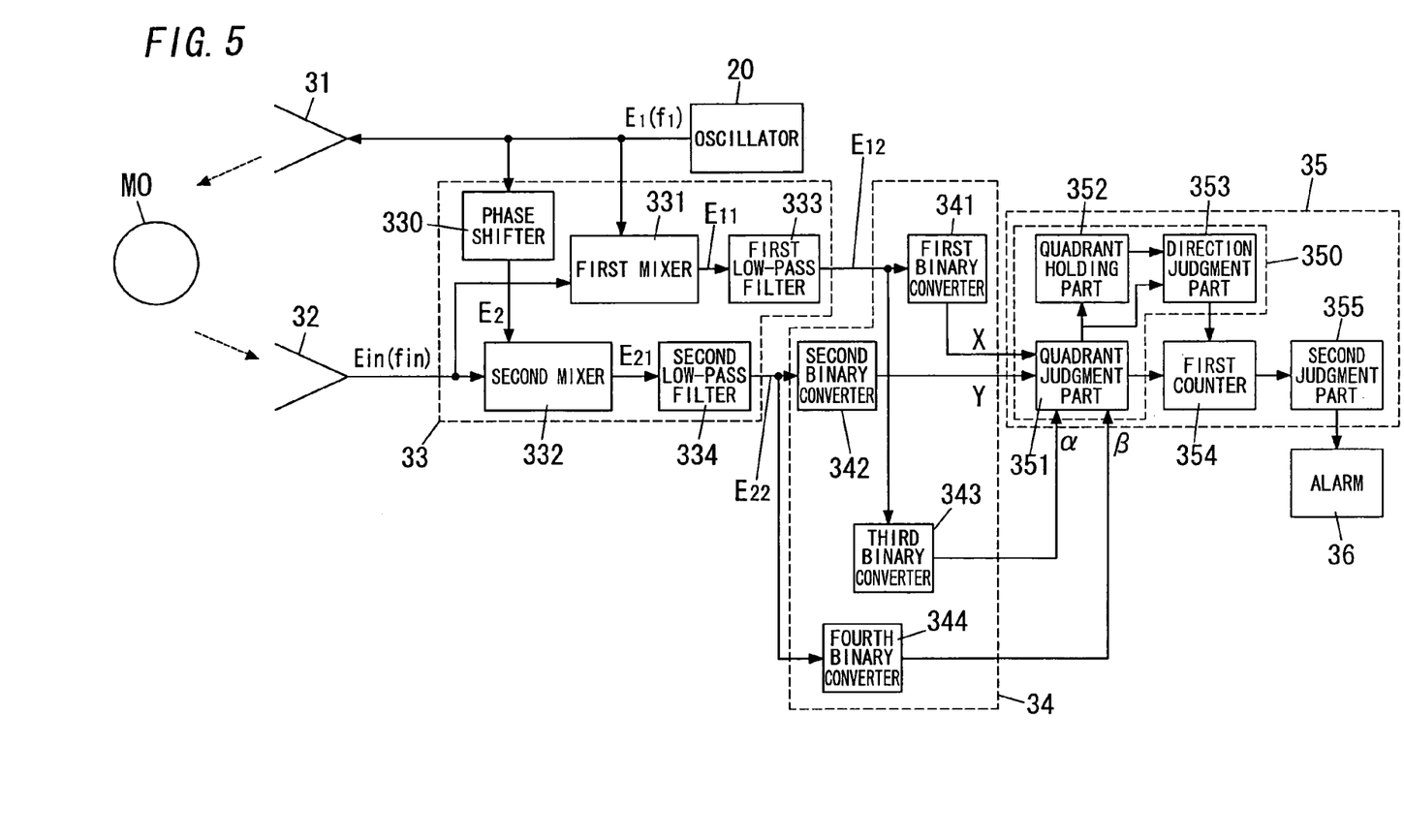
FIG. 5 is a block diagram of a third embodiment according to the present invention.

FIG. 5 shows a third embodiment according to the present invention, namely moving object detection apparatus. This apparatus is provided with an oscillator 30, a transmitter 31, a receiver 32, a detection portion 33, an alarm 36 and a power source (not shown) which are formed like the second embodiment, and is further provided with a binary conversion portion 34 and a judgment portion 35.

Figure 6:
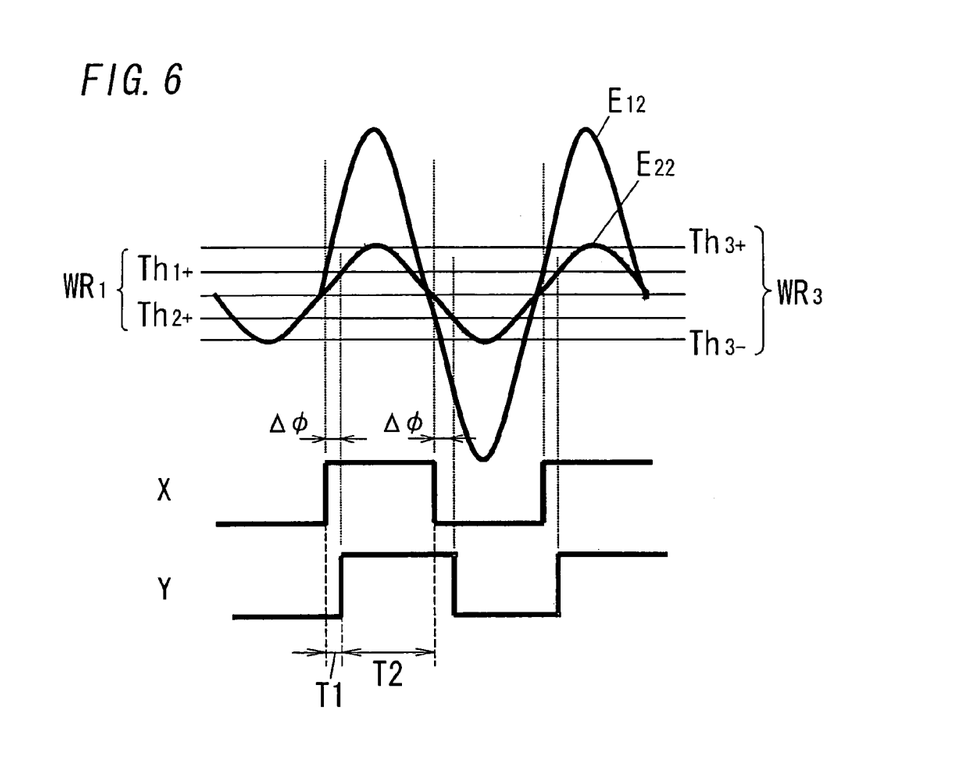
FIG. 6 is an explanatory diagram of operations of a binary conversion portion and a judgment portion in the third embodiment.

In addition to first and second binary converters 341 and 342 which are formed like the second embodiment, the binary conversion portion 34 is provided with third and fourth binary converters 343 and 344 according to an aspect of the third embodiment. The third binary converter 343 is configured to compare a first detection signal $E_{12}$ with third window signals to obtain a third binary signal α. The fourth binary converter 344 is also configured to compare a second detection signal $E_{22}$ with fourth window signals to obtain a fourth binary signal β. For example, each of the converters 343 and 344 is formed of a window comparator. As shown in FIG. 6, the third window signals are set to a third window range $WR_3$ greater than a first window range $WR_1$ specified by first window signals of the converter 341. In addition, in the example of FIG. 6, each absolute value of the upper limit $Th_{3+}$ and the lower limit $Th_{3-}$ of the third window range $WR_3$ is set to a smaller value than amplitude of the signal $E_{12}$. The second window range specified by the second window signals of the converter 342 is set to be equal to the range $WR_1$ substantially. The fourth window range is set to be equal to the range $WR_3$ substantially.

The judgment portion 35 comprises a first judgment part 350 (a quadrant judgment part 351, a quadrant holding part 352 and a direction judgment part 353), a first counter 354 and a second judgment part 355 which are formed like the second embodiment. In addition, the portion 35 is configured to remove unwanted components caused by small vibration according to an aspect of the third embodiment. If a level of the first or second detection signal is within the third or fourth window range, respectively, the judgment part 350 judges that a moving object MO does not exists in the detection area regardless of first and second binary signals X and Y. That is, if output levels of the third and fourth binary converters 343 and 344 do not change, the part 350 judges that the object MO does not exists in the area. If levels of the first and second detection signals are out of the third and fourth window ranges, respectively, the part 350 performs first to third processes like the judgment part 250 of the second embodiment when the phase difference Δϕ between the first and second binary signals is larger than a reference phase. The reference phase corresponds to the difference between the first or second window range and the third or fourth window range.

For example, when window glasses of a vehicle mounted with the moving object detection apparatus generate small vibration in response to vibration from the other vehicles passing by the vehicle, the second embodiment has an issue that incoming ultrasonic waves from the transmitter 21 receive phase modulation caused by the small vibration. When the signals $E_{in}$ and $E_1$ are respectively represented by sin $(\omega t+\phi+f_m$ sin $\omega_o t)$ and sin $(\omega t+\phi)$, the signal $E_{11}$ and $E_{21}$ are respectively given by $$E_{11}=\sin(\omega t+\phi+f_m \sin \omega_o t)\sin \omega t \approx \frac{1}{2}f_m \sin \phi \sin \omega_o t,$$

$$E_{21}=\sin(\omega t+\phi+f_m \sin \omega_o t)\cos \omega t \approx \frac{1}{2}f_m \cos \phi \sin \omega_o t,$$

where $f_m$ sin $\omega_o t$ is small vibration and $f_m$ is $f_m \ll 1$. In this case, if ϕ is 0 or π/2, either of the signals $E_{11}$ and $E_{21}$ becomes zero. If ϕ is π/4 or 3π/4, the signals $E_{11}$ and $E_{21}$ become anti-phase or in-phase.

In case of the second embodiment, as shown in FIG. 6, when in-phase signals $E_{12}$ and $E_{22}$ have mutual different amplitudes, transition factors change even if a moving object MO does not exist in the detection area. That is, transition factors change into (0, 0) representative of the third quadrant, (1, 0) representative of the fourth quadrant, (1, 1) representative of the first quadrant, (0, 1) representing the second quadrant, (0, 0) representative of the third quadrant, and so on. In short, since each transition factor $(X_n, Y_n)$ turns counterclockwise, the judgment portion 25 makes false detection that a moving object MO approaching the receiver 22 exists in the detection area.

In order to avoid the false detection, the moving object detection apparatus of the third embodiment is provided with the binary conversion portion 34 and the judgment portion 35. When the receiver 32 receives incoming ultrasonic waves caused by small vibration, if the level of a signal $E_{22}$ obtained from the incoming ultrasonic waves is smaller than that of a signal $E_{12}$ and is in the third and fourth window ranges, the judgment part 350 judges that a moving object MO does not exists in the detection area. Therefore, it can be prevented that false detection is made under the influence of small vibration when a moving object MO does not exist in the detection area.

Figure 7A:
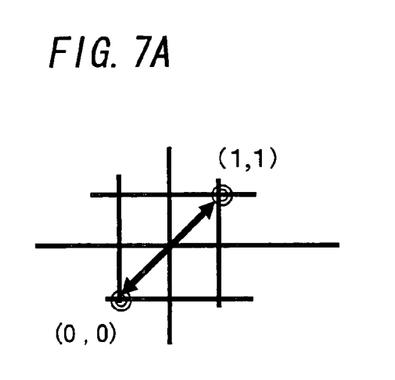
FIGS. 7A and 7B illustrate judgment examples in case that the judgment portion does not renew a first count value.
Figure 7B:
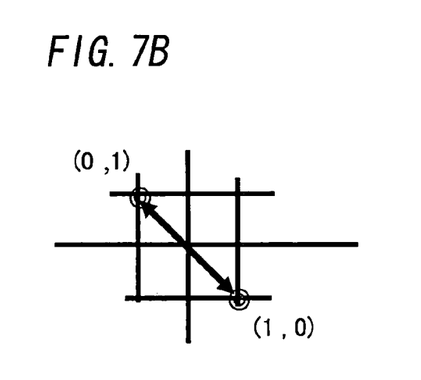

However, since there is a case that the level of a signal $E_{22}$ obtained from said incoming ultrasonic waves is out of the third and fourth window ranges, the judgment part 350 further utilizes the phase difference $\Delta\phi$ between the first and second binary signals X and Y If the phase difference $\Delta\phi$ is equal to or smaller than said reference phase, the signals $E_{12}$ and $E_{22}$ are almost in-phase or anti-phase, and it is thought that absolute values of those amplitudes are different from each other. Accordingly, it can be supposed that the incoming ultrasonic waves are ultrasonic waves caused by small vibration. In other words, in case that a moving object MO is human, it is considered that the object MO requires the time that the phase difference $\Delta\phi$ exceeds the reference phase in order to change the moving direction. In the example of FIG. 6, each of the third and fourth window ranges is set to twice of each of the first and second window ranges. In this case, the phase difference $\Delta\phi$ reaches $\pi/6(=30°)$ at a point in time at which the signals $E_{12}$ and $E_{22}$ becomes out of the third and fourth window ranges. If the phase difference $\Delta\phi$ is a value in the neighborhood of $\pi/6$, it is considered that the incoming ultrasonic waves are ultrasonic waves caused by small vibration, and accordingly in the third embodiment, the reference phase is set, for example, within the range from $\pi/6$ to $\pi/4$, preferably to $\pi/6$. Therefore, if the levels of the first and second detection signals are out of the third and fourth window ranges, respectively, the part 350 performs the first to third processes when the phase difference $\Delta\phi$ is larger than the reference phase. Consequently, it can be further prevented that false detection is made under the influence of, for example, small vibration when a moving object MO does not exist in the detection area. Specifically, the part 350 judges whether or not the phase difference $\Delta\phi$ is larger than the reference phase based on a ratio of period T1 to period T2 shown in FIG. 6. For example, in case that the reference phase is $\pi/4$, if T1:T2 is within the range from 1:3 to 3:1, the part 350 performs the first to third processes. Otherwise, the part 350 does not perform the first to third processes. In this case, the part 350 may judge that quadrant factors move between the first quadrant and the third quadrant as shown in FIG. 7A, or move between the second quadrant and the fourth quadrant as shown in FIG. 7B.

Figure 8:
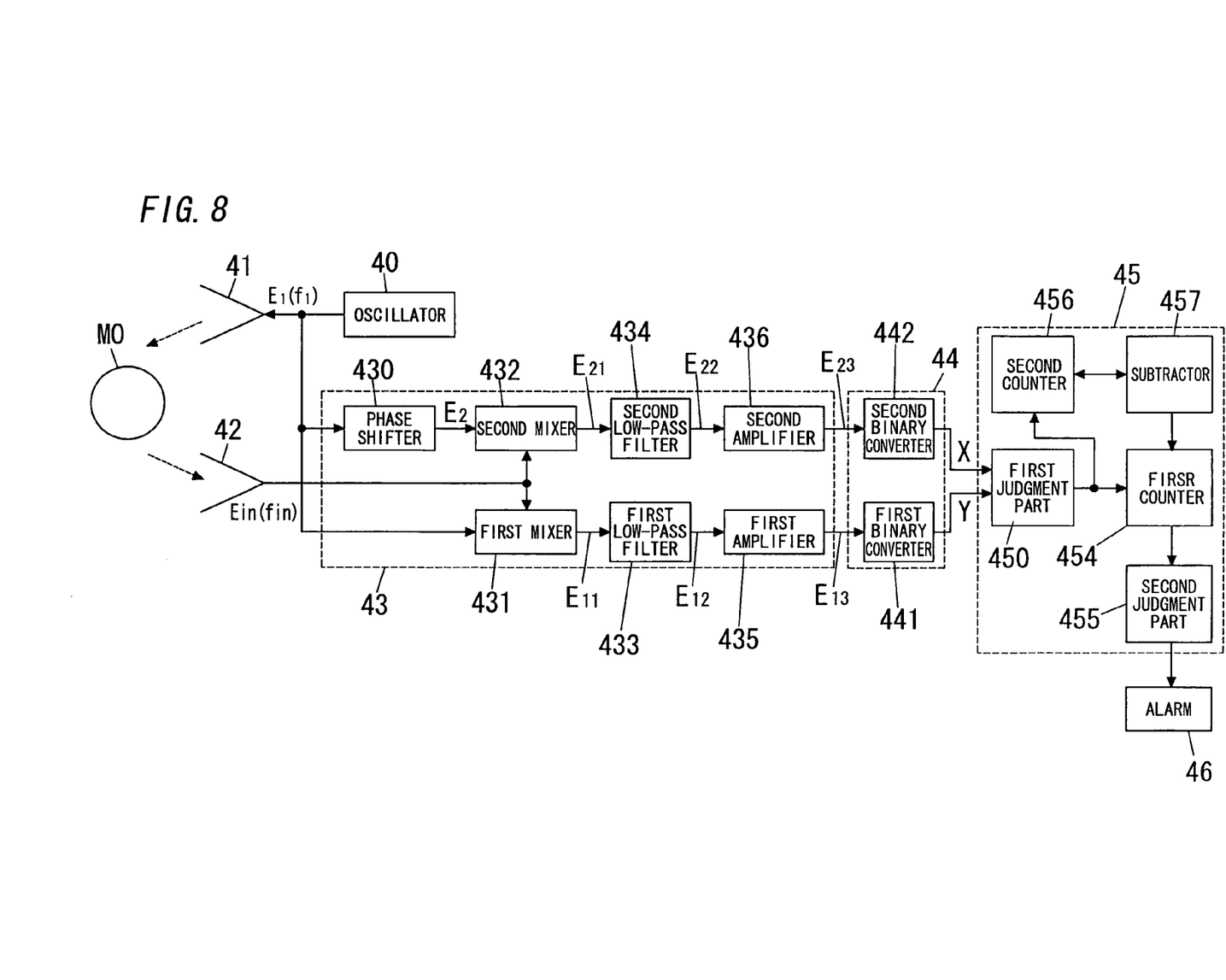
FIG. 8 is a block diagram of a fourth embodiment according to the present invention.

FIG. 8 shows a fourth embodiment according to the present invention, namely moving object detection apparatus. This apparatus is provided with an oscillator 40, a transmitter 41, a receiver 42, a binary conversion portion 44, an alarm 46 and a power source (not shown) which are formed like the second embodiment, and is further provided with a detection portion 43 and a judgment portion 45. In addition to a phase shifter 430, first and second mixers 431 and 432, and first and second filters 433 and 434 which are formed like the second embodiment, the detection portion 43 is provided with first and second amplifiers 435 and 436. The amplifier 435 amplifies the signal $E_{12}$ obtained by removing high frequency from a signal $E_{11}$ through the filter 433, and then supplies the portion 44 with a signal (detection signal) $E_{13}$ obtained by the amplification. The amplifier 436 amplifies the signal $E_{22}$ obtained by removing high frequency from a signal $E_{21}$ through the filter 434, and then supplies the portion 44 with a signal (detection signal) $E_{23}$ obtained by the amplification. However, the amplifiers 435 and 436 may be omitted.

In addition to a first judgment part 450, a first counter 454 and a second judgment part 455 which are formed like the second embodiment, the judgment portion 45 is provided with a second counter 456 and a subtractor 457 according to an aspect of the fourth embodiment. The counter 456 counts the number of times that the part 450 continuously judges that a moving object MO does not exists in a detection area, and then obtains a second count value corresponding to that. In the fourth embodiment, the counter 456 obtains the second count value equal to the number of times.

The subtractor 457 reduces absolute values of the first and second count values when the absolute value of the second count value is greater than that of a second threshold value. In the fourth embodiment, when the absolute value of the second count value is greater than that of the second threshold value, the subtractor 457 resets each of the first and second count values to zero.

The operation of the fourth embodiment is now explained. The transmitter 41 emits ultrasonic waves with a frequency $f_1$ to a detection area in accordance with a signal $E_1$ from the oscillator 40. On the other hand, the detection portion 43 produces signals $E_{13}$ and $E_{23}$ in response to a signal $E_{in}$ from the receiver 42 to supply the signals to the first judgment part 450 through the binary conversion portion 44. The portion 45 takes a transition factor from binary signals X and Y, and judges whether or not a moving object MO exists in the area based on the transition factor. In case that the object MO exists, the portion 45 judges whether the object MO approaches or leaves the receiver 42. The first counter 454 then renews the first count value based on each judgment result of the part 450. At this point, the second counter 456 counts the number of times the part 450 continuously judges that the object MO does not exists in the area, namely the second count value. The subtractor 457 resets each of the first and second count values to zero when the second count value is greater than the second threshold value. The second judgment part 455 supplies an existence signal to the alarm 46 when the first count value is greater than the first threshold value. In response to the signal, the alarm 46 gives an alarm.

The second embodiment has a possibility that the first count value is increased when, for example, the first judgment part 250 judges that a moving object MO exists in a detection area under the influence of low frequency noise caused by air fluid in the area. In the fourth embodiment, even if the first judgment part 450 makes a false judgment that the object MO exists in the area, for example, under the influence of low frequency noise caused by air fluid in the area, the part 450 continuously judges that the object MO does not exist in the area under such low frequency noise in general. Therefore, the second count value can be made larger than the second threshold value. As a result, since the first count value is decreased, it can be avoided that the false detection is made under the influence of low frequency noise when the object MO does not exist in the area.

Figure 9:
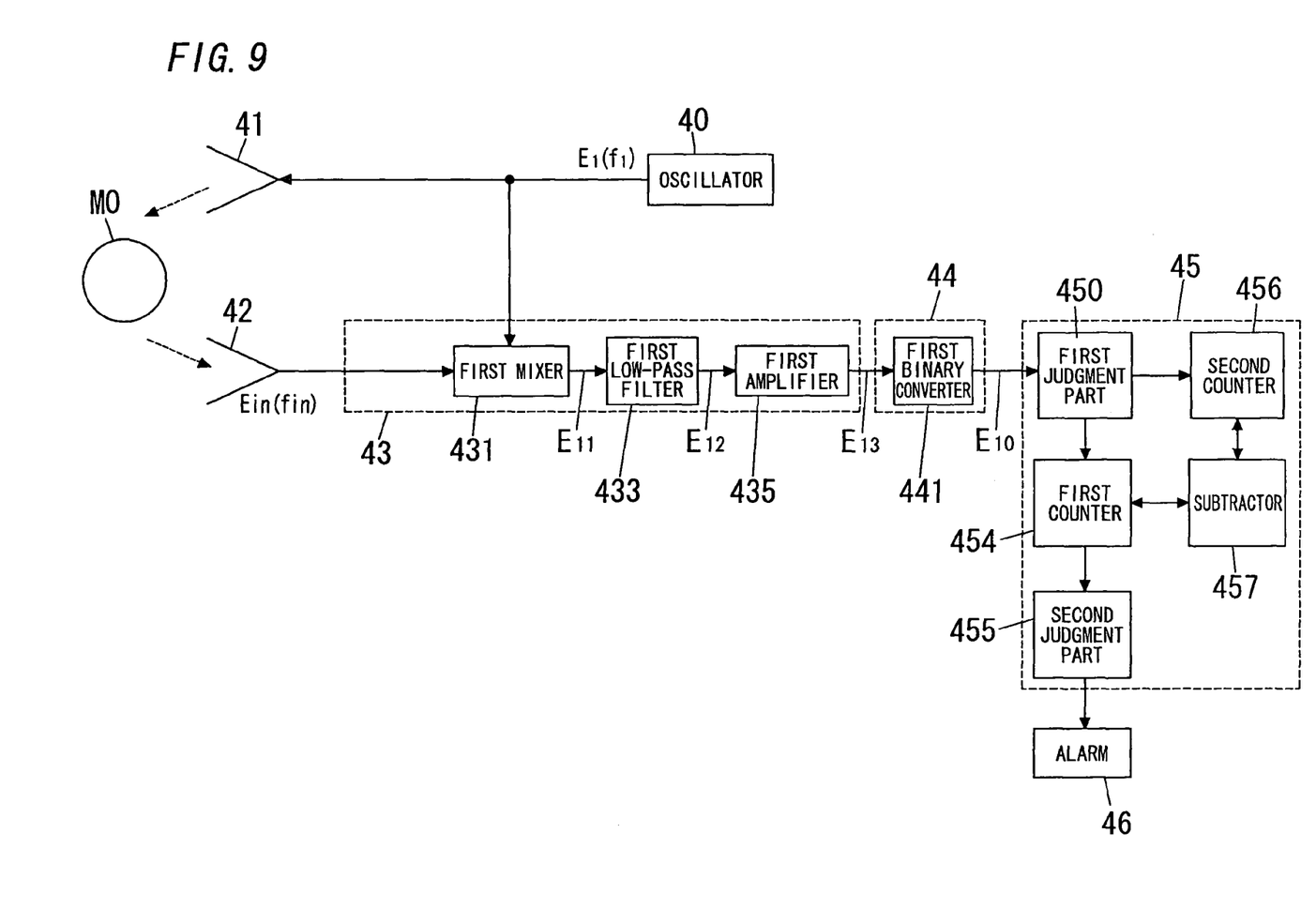
FIG. 9 is a block diagram of a varied embodiment.

In a varied embodiment, the detection portion 43 is configured to produce one of the first and second detection signals $E_{13}$ and $E_{23}$. The first judgment part 450 is also configured to judge whether or not a moving object MO exists in a detection area based on a signal from the portion 43. For example, as shown in FIG. 9, the portion 43 is formed of a first mixer 431, a first low-pass filter 433 and a first amplifier 435. This portion 43 produces a first detection signal $E_{13}$ from a signal $E_{in}$ and a first reference signal $E_1$, and supplies the signal $E_{13}$ to the first judgment part 450 through the first binary converter 441. The part 450 detects frequency $f_{in}-f_1$ of the Doppler signal obtained from the signal $E_{10}$, and compares the frequency with a specified frequency range. When the object MO is, for example, human, the specified frequency range is set based on human moving speed. The part 450 judges that the object MO exists in the area if the frequency $f_{in}-f_1$ is in the specified frequency range. Otherwise, it is judged that the object MO does not exist in the area. The first counter 454 adds a constant value (e.g., "1") to the first count value if the part 450 judges that the object MO exists in the area. If the part 450 judges that the object MO does not exist in the area, the first count value is kept as-is. The second judgment part 455, second counter 456, subtractor 457 and alarm 46 are formed like, for example, those of FIG. 8.

In another varied embodiment, the subtractor 457 reduces the absolute value of the first count value by a predetermined value up to zero when the absolute value of the second count value is greater than that of the second threshold.

Although the present invention has been described with reference to certain preferred embodiments, numerous modifications and variations can be made by those skilled in the art without departing from the true spirit and scope of this invention.

The invention claimed is:

1. Moving object detection apparatus, comprising:
a transmitter that emits energy waves with a first frequency to a detection area;
a receiver that, when receiving incoming energy waves from the detection area, generates an electric signal corresponding to the incoming energy waves;
a detection portion that obtains a detection signal from a reference signal with the first frequency and the electric signal, the detection signal becoming a Doppler shift signal when at least one second frequency different from the first frequency is obtained from the electric signal, the Doppler shift signal being obtained from the first frequency and the at least one second frequency;
a binary conversion portion that compares the detection signal with a conversion threshold signal to obtain a binary signal; and
a judgment portion that judges whether or not a moving object approaching or leaving the receiver exists in the detection area based on the binary signal,
wherein the moving object detection apparatus further comprises an oscillator that generates a first reference signal having the first frequency and supplies the transmitter with the first reference signal to cause the transmitter to emit sine-wave shaped energy waves with the first frequency to the detection area;
wherein the detection portion comprises:
a phase shifter that shifts the phase of the first reference signal by ¼period to produce a second reference signal;
a first detection part that mixes the electric signal generated by the receiver with the first reference signal generated by the oscillator to produce a first detection signal, the first detection signal becoming a first Doppler shift signal that has a frequency of the difference between the first frequency and the second frequency when the second frequency is obtained from the electric signal; and
a second detection part that mixes the electric signal generated by the receiver with the second reference signal produced by the phase shifter to produce a second detection signal, the second detection signal becoming a second Doppler shift signal that has a frequency of the difference between the first frequency and the second frequency and is different in phase by ¼ period from the first Doppler shift signal when the second frequency is obtained from the electric signal;

wherein the binary conversion portion comprises:
a first binary converter that compares the first detection signal with a first conversion threshold signal to obtain a first binary signal; and
a second binary converter that compares the second detection signal with a second conversion threshold signal to obtain a second binary signal;
wherein the judgment portion comprises:
a first judgment part that is configured to: (A) take a transition factor whenever first and second values are respectively set to first and second coordinates in two-dimensional coordinate system in response to the levels of the first and second binary signals, said transition factor being specified by the first and second coordinates; (B) judge that said moving object exists in the detection area if taken each transition factor crosses one coordinate axis in the coordinate system, and otherwise to judge that said moving object does not exist in the detection area; and (C) judge that said moving object approaches the receiver if said each transition factor moves around the origin of the coordinate system in one direction, and to judge that said moving object leaves the receiver if said each transition factor moves in reverse direction to the one direction, in case that said moving object exists in the detection area;
a first counter that is configured to: (a) add a first polarity value to a first count value in case that said moving object exists in the detection area and approaches the receiver; and (b) to add a second polarity value to the first count value in case that said moving object exists in the detection area and leaves the receiver, said second polarity value being equal in absolute value to the first polarity value and different in polarity from the first polarity value;
a second judgment part that sends out an existence signal when the absolute value of the first count value is larger than that of a judgment threshold value that is equal in polarity to the first polarity value, the existence signal representing that said moving object exists in the detection area.

2. The moving object detection apparatus of claim 1, wherein:
the first detection part includes a first signal pass for supplying the binary conversion portion with the electric signal generated by the receiver, and a first field effect transistor that is connected between the first signal pass and Ground and turned on and off in response to the first reference signal, the first field effect transistor producing the first detection signal by adding the first reference signal components corresponding to a predetermined polarity to the electric signal; and
the second detection part includes a second signal pass for supplying the binary conversion portion with the electric signal generated by the receiver, and a second field effect transistor that is connected between the second signal pass and Ground and turned on and off in response to the second reference signal, the second field effect transistor producing the second detection signal by adding the second reference signal components corresponding to a predetermined polarity to the electric signal.

3. The moving object detection apparatus of claim 1, wherein a power source of the moving object detection apparatus is comprised of a switching regulator, a switching frequency of the regulator being equal to or higher than the first frequency.

4. The moving object detection apparatus of claim 1, wherein the binary conversion portion further comprises:
- a third binary converter that compares the first detection signal with a third window signal to obtain a third binary signal, the third window signal being set to a third window range larger than a first window range specified by a first window signal as the first conversion threshold signal; and
- a fourth binary converter that compares the second detection signal with a fourth window signal to obtain a fourth binary signal, the fourth window signal being set to a fourth window range larger than a second window range specified by a second window signal as the second conversion threshold signal, the second window range being substantially equal to the first window range, the fourth window range being substantially equal to the third window range;
- wherein the first judgment part is configured to: (1) judge that said moving object does not exist the detection area regardless of the first and second binary signals if a level of the first or second detection signal is within the third or fourth window range, respectively; and (2) perform said (A), (B) and (C) when the phase difference between the first and second binary signals is larger than a reference phase if the levels of the first and second detection signals are outside the third and fourth window ranges, respectively, the reference phase corresponding to the difference between the first or second window range and the third or fourth window range.

5. The moving object detection apparatus of claim 4, wherein each of the third and fourth window ranges is set to twice of each of the first and second window ranges, and the reference phase is set in the range of $\pi/6$ to $\pi/4$.

6. Moving object detection apparatus, comprising:
- a transmitter that emits energy waves with a first frequency to a detection area;
- a receiver that, when receiving incoming energy waves from the detection area, generates an electric signal corresponding to the incoming energy waves;
- a detection portion that obtains a detection signal from a reference signal with the first frequency and the electric signal, the detection signal becoming a Doppler shift signal when at least one second frequency different from the first frequency is obtained from the electric signal, the Doppler shift signal being obtained from the first frequency and the at least one second frequency;
- a binary conversion portion that compares the detection signal with a conversion threshold signal to obtain a binary signal; and
- a judgment portion that judges whether or not a moving object approaching or leaving the receiver exists in the detection area based on the binary signal,
wherein the judgment portion comprises:
- a first judgment part that judges whether or not said moving object exists in the detection area based on the binary signal;
- a first counter that renews a first count value based on each judgment result of the first judgment part, said counter adding a constant value to the first count value if the first judgment part judges that said moving object exists in the detection area, said counter keeping the first count value as-is if the first judgment part judges that said moving object does not exist in the detection area;
- a second judgment part that sends out an existence signal when the absolute value of the first count value is larger than that of a first judgment threshold value, said existence signal representing that said moving object exists in the detection area;
- a second counter that counts the number of times the first judgment part continuously judges that said moving object does not exist in the detection area, and then obtains a second count value corresponding thereto; and
- a subtracter that decreases the absolute value of the first count value when the absolute value of the second count value is larger than that of a second judgment threshold value.

7. The moving object detection apparatus of claim 6, wherein the judgment portion further comprises:
- a second counter that counts the number of times the first judgment part continuously judges that said moving object does not exist in the detection area, and then obtains a second count value corresponding thereto; and
- a subtracter that decreases the absolute value of the first count value when the absolute value of the second count value is larger than that of a second judgment threshold value.

* * * * *